Jan. 3, 1967   F. R. LEATHERMAN   3,295,802
CHRISTMAS TREE STAND
Filed March 16, 1965

INVENTOR.
FRANCIS R. LEATHERMAN
BY Knox & Knox

United States Patent Office 3,295,802
Patented Jan. 3, 1967

3,295,802
CHRISTMAS TREE STAND
Francis R. Leatherman, 1203 Coral St.,
El Cajon, Calif. 92021
Filed Mar. 16, 1965, Ser. No. 440,137
1 Claim. (Cl. 248—44)

The present invention relates generally to post or stem supports and more specifically to a Christmas tree stand.

Contemporaneous types of tree stands include the type which involves the assembly of several legs to a base and has several clamp screws to grip the trunk, the type with hinged legs having claw or hook elements which penetrate and grip the trunk, and similar multiple adjustment devices. In most cases it is difficult to adjust or set the clamping means to hold the tree properly upright, especially when the operator cannot view the tree in proper perspective while making the adjustments.

It is the primary object of this invention, therefore, to provide a tree stand which ensures proper vertical positioning of the tree and is held by a single, quickly operable clamp to form a wide stable base for even a large tree.

Another object of this invention is to provide a tree stand which is self-adjusting to any tree in the normal range of sizes of domestic Christmas trees.

Another object of this invention is to provide a tree stand which allows the base of the tree trunk to be immersed in water to keep the tree fresh and reduce fire hazard.

A further object of this invention is to provide a tree stand utilizing two identical leg elements, which can be made from sheet metal, or similar material, and will nest for convenient storage.

In the drawings.

Similar characters of reference indicate similar or identical elements and portions throughout the specification and throughout the views of the drawing.

Figure 1:
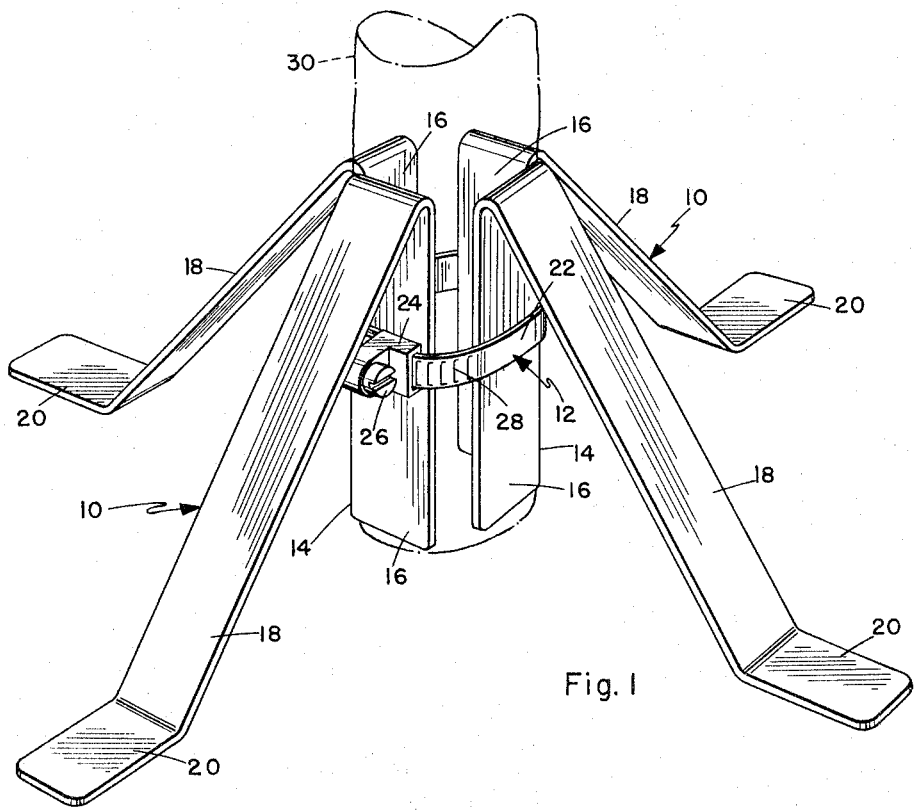
FIGURE 1 is a perspective view of the assembled tree stand, with a tree trunk indicated in broken line.

The stand is composed of a pair of identical stand units 10 and a single clamp 12. Each stand unit 10 has an upright post portion 14 of V-shaped cross section with sides 16, 16 similar to a length of angle iron. Extending from the upper ends of each of the sides 16, 16 are outwardly and downwardly inclined legs 18, 18 with outwardly turned feet 20, 20 at the lower ends thereof, the legs being of sufficient length to hold the lower end of post portion 14 clear of the supporting surface on which the feet are resting. The legs 18, 18 of each stand unit are disposed at right angles to each other in plan view, so that the two units together provide a four point, wide based support.

Clamp 12, as illustrated, is a constricting type hose clamp of well known configuration and comprises a somewhat flexible strap 22 on one end of which is a slotted receiver 24 carrying a clamp screw 26. The strap is passed around the structure to be clamped and the end is inserted into receiver 24, said strap having indentations 28 which serve as screw threads and are engaged by clamp screw 26 to draw in the strap and tighten the clamp. This type of clamp is available in a variety of sizes and the clamp used may differ in detail from the arrangement illustrated, which is merely typical.

The two stand units 10 are attached to a tree trunk 30 on opposite sides with the trunk seated in the angle of each post portion 14, clamp 12 being fastened with strap 22 encircling both post portions and the trunk. It is a simple matter to align the ends of post portions 14 longitudinally on the trunk 30, which will bring all the feet 20 into coplanar alignment and ensure that the tree will be held vertically. With this simple arrangement it is unnecessary to step back and view the tree and then adjust the stand, perhaps several times, to hold the tree vertical. The single clamp 12 can be tightened securely with a screwdriver, or even a coin which will fit the slot of screw 26.

Figure 2:
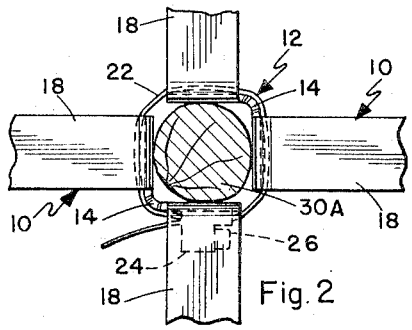
FIGURE 2 is a fragmentary top plan view of the stand attached to a small tree.
Figure 3:
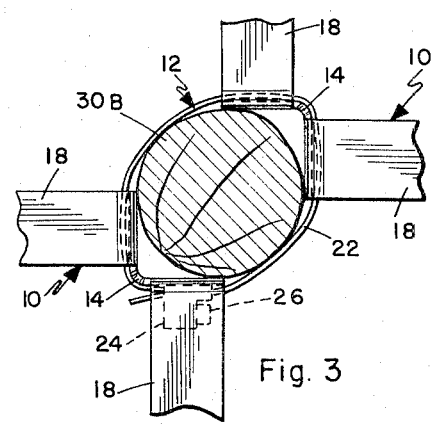
FIGURE 3 is a fragmentary top plan view of the stand attached to a large tree.

Since the sides 16 are substantially in tangential contact with trunk 30 along their length, the post portions 14 are self-aligning in parallel relation on the trunk. By seating on the trunk in this manner the stand units are adaptable to trees of all sizes. A small trunk 30A, having a diameter about equal to the width of a wall 16, is indicated in FIGURE 2, this being near the minimum size which can be clamped securely. A larger stem 30B is shown in FIGURE 3, one size of leg unit being adaptable to all trees in the range of sizes normally used.

Figure 4:
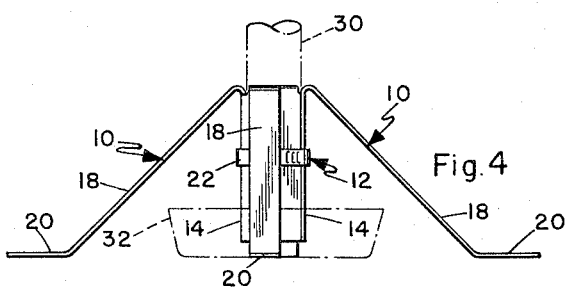
FIGURE 4 is a side elevation view, on a reduced scale, showing the placement of a water pan.

By holding the lower ends of post portions 14 just clear of the supporting surface, space is provided to insert a suitable pan 32, as indicated in broken line in FIGURE 4, to contain water in which the tree stem is immersed. This will keep the tree fresh and reduce the risk of fire.

The stand units can be fabricated from angle section stock, with conventional tooling. When not in use the stand units can be nested, one inside the other, and held together by the clamp for storage in a minimum of space.

It is understood that minor variation from the form of the invention disclosed herein may be made without departure from the spirit and scope of the invention, and that the specification and drawings are to be considered as merely illustrative rather than limiting.

I claim:

A tree stand, comprising:
 a pair of stand units for disposal at diametrically opposite sides of a tree trunk and each having an elongated upright post portion of V-shaped cross-section with adjacent sides substantially at right angles to each other, and each unit also having two legs extending divergently at right angles to each other outwardly and downwardly from the upper ends of said sides and having supporting feet at the lower ends thereof;
 and a constricting clamp including a flexible strap encircling the post portions of said pair of stand units to clamp the same onto a tree trunk held therebetween;
 said legs being rigid flat straps formed from standard angle-section stock, and each leg and the corresponding post portion being in the same respective vertical plane.

References Cited by the Examiner
UNITED STATES PATENTS 2,485,233  10/1949  Cima _____ 248—44
2,706,023  4/1955   Merritt _____ 248—231 X
2,747,820  5/1956   Blu _____ 248—44

CLAUDE A. LE ROY, Primary Examiner.

CHANCELLOR E. HARRIS, Examiner.

J. PETO, Assistant Examiner.